(12) United States Patent
Kim et al.

(10) Patent No.: US 8,755,593 B2
(45) Date of Patent: Jun. 17, 2014

(54) APPARATUS AND METHOD FOR VIDEO SENSOR-BASED HUMAN ACTIVITY AND FACIAL EXPRESSION MODELING AND RECOGNITION

(75) Inventors: Hyun-Soo Kim, Suwon-si (KR); Jong-Chang Lee, Suwon-si (KR); Dae-Hyun Sim, Seoul (KR); Tae-Seong Kim, Yongin-si (KR)

(73) Assignees: Samsung Electronics Co., Ltd., Suwon-si (KR); Kyung Hee University, University-Industry Cooperation Group of Kyung Hee University, Yongin-si (KR)

( * ) Notice: Subject to any disclaimer, the term of this patent is extended or adjusted under 35 U.S.C. 154(b) by 630 days.

(21) Appl. No.: 12/802,381

(22) Filed: Jun. 4, 2010

(65) Prior Publication Data

US 2010/0310157 A1 Dec. 9, 2010

(30) Foreign Application Priority Data

Jun. 5, 2009 (KR) ........................ 10-2009-0049744

(51) Int. Cl.
*G06K 9/00* (2006.01)
*G06K 9/62* (2006.01)

(52) U.S. Cl.
USPC ........... 382/159; 382/154; 382/209; 382/224; 382/225

(58) Field of Classification Search
None
See application file for complete search history.

(56) References Cited

U.S. PATENT DOCUMENTS

| | | | | |
|---|---|---|---|---|
| 6,751,354 B2 * | 6/2004 | Foote et al. | ........... | 382/224 |
| 7,203,356 B2 * | 4/2007 | Gokturk et al. | ........... | 382/154 |
| 7,574,020 B2 * | 8/2009 | Shamaie | ........... | 382/103 |
| 7,970,718 B2 * | 6/2011 | Guyon et al. | ........... | 706/20 |
| 8,335,355 B2 * | 12/2012 | Costache et al. | ........... | 382/118 |
| 8,345,983 B2 * | 1/2013 | Noguchi et al. | ........... | 382/190 |

OTHER PUBLICATIONS

Uddin et al., "Independent Component Feature-based Human Activity Recognition via Linear Discriminant Analysis and Hidden Markov Model",30th Annual International IEEE EMBS Conference, Vancouver, British Columbia, Canada, Aug. 20-24, 2008, pp. 5168-5171.*

\* cited by examiner

*Primary Examiner* — Thomas Conway

(57) ABSTRACT

An apparatus and method for human activity and facial expression modeling and recognition are based on feature extraction techniques from time sequential images. The human activity modeling includes determining principal components of depth and/or binary shape images of human activities extracted from video clips. Independent Component Analysis (ICA) representations are determined based on the principal components. Features are determined through Linear Discriminant Analysis (LDA) based on the ICA representations. A codebook is determined using vector quantization. Observation symbol sequences in the video clips are determined. And human activities are learned using the Hidden Markov Model (HMM) based on status transition and an observation matrix.

16 Claims, 9 Drawing Sheets

| FEATURES | ACTIVITY | RECOGNITION RATE WITH HMM | MEAN | STANDARD DEVIATION |
|---|---|---|---|---|
| LDA ON IC FEATURES OF BINARY SHAPES | WALKING | 84 | 91.33 | 8.17 |
| | RUNNING | 96 | | |
| | SKIPPING | 88 | | |
| | BOXING | 100 | | |
| | SITTING | 84 | | |
| | STANDING | 100 | | |
| LDA ON IC FEATURES OF DEPTH SHAPES | WALKING | 96 | 96.67 | 4.68 |
| | RUNNING | 96 | | |
| | SKIPPING | 88 | | |
| | BOXING | 100 | | |
| | SITTING | 100 | | |
| | STANDING | 100 | | |

FIG.9A

| FEATURES | ACTIVITY | RECOGNITION RATE WITH HMM | MEAN | STANDARD DEVIATION |
|---|---|---|---|---|
| LDA ON IC FEATURES OF RGB FACES | ANGER | 80 | 81.71 | 6.24 |
| | JOY | 90 | | |
| | SADNESS | 81.82 | | |
| | SURPRISE | 75 | | |
| LDA ON IC FEATURES OF DEPTH FACES | ANGER | 100 | 100 | 0 |
| | JOY | 100 | | |
| | SADNESS | 100 | | |
| | SURPRISE | 100 | | |

FIG.9B

APPARATUS AND METHOD FOR VIDEO SENSOR-BASED HUMAN ACTIVITY AND FACIAL EXPRESSION MODELING AND RECOGNITION

CROSS-REFERENCE TO RELATED APPLICATION(S) AND CLAIM OF PRIORITY

The present application claims the benefit under 35 U.S.C. §119(a) to a Korean patent application filed in the Korean Intellectual Property Office on Jun. 5, 2009, and assigned Serial No. 10-2009-0049744, the entire disclosure of which is hereby incorporated by reference.

TECHNICAL FIELD OF THE INVENTION

The present invention relates generally to an apparatus and a method for recognizing human activity using depth and/or binary shape information of the human body, and recognizing facial expression using depth and/or Red Green Blue (RGB) information of the human face from sequential video frames. More specifically, the present invention relates to an apparatus and a method for modeling based on feature extraction techniques from time sequential images.

BACKGROUND OF THE INVENTION

Recently, research for recognizing human activity and facial expression has advanced thanks to proactive computing. Proactive computing focuses on the health related needs of people by studying solutions in advance, and intends to take necessary actions on their behalf.

Facial expression and human activity recognition is regarded as a fundamental technique in Human Computer Interaction (HCI). HCI enables the computer to interrelate with humans such as human to human interaction.

Accordingly, facial expression and human activity recognition can contribute to the design of a HCI system which responds to the expressive states of human and human behaviors.

Typically, in the general shape-based human activity recognition technology, binary shapes are commonly used to represent different human activities.

In the binary representation, some body components (e.g., arms) are commonly hidden in the binary shapes of different activities (e.g., clapping). This causes ambiguities when the same binary shape is assigned to different activities. Hence, efficient representation of the human body in the different activities is quite important.

Mostly, Principal Component Analysis (PCA), which is a second-order statistical approach, is used to decrease the dimension of the database including human activity images. Basically, PCA basis images are orthogonal to each other and represent global features focusing on the body components which are frequently used in the activity.

In general approaches, the PCA features are typically combined with Hidden Markov Model (HMM) to recognize different human activities. However, the PCA representation of the binary shape of the human activity exhibits a low recognition rate, which is proven to be inefficient.

In general Facial Expression Recognition (FER), there are several methods for recognize facial expressions. One of the methods identifies the muscle movement in the face according to changes in Facial Action Units (FAUs).

Another method separates the holistic facial expressions corresponding to the global expressions such as joy, anger, disgust, fear, and sadness, using the PCA.

Lately, to distinguish facial expressions on the type basis, Independent Component Analysis (ICA) method with its function for extracting local features is excessively used in the FER tasks.

The ICA method reduces the statistical dependency of a set of input random variables to generate the statistically independent basis and coefficients and is popularly used to recognize the facial expressions.

However, it turns out that many techniques attempted have revealed their limitations and difficulties. The FER based on the FAU using the general ICA has a huge potential for the expressions. The expression varies based on the diverse combination of the FAUs, which causes a very complicated FER problem.

Moreover, because temporal variations in the face are assembled into a specific expression, the generic ICA employed for the holistic facial representation has been applied only to the static images of apex expression for extracting inadequate spatial information.

However, the temporal information needs to be deliberated because of the FER problem.

SUMMARY OF THE INVENTION

To address the above-discussed deficiencies of the prior art, it is a primary aspect of the present invention to provide an apparatus and a method for video sensor-based human activity and facial expression modeling and recognition.

Another aspect of the present invention is to provide an apparatus and a method for providing depth images in addition to binary shape information of a human body in relation to human activity recognition.

Yet another aspect of the present invention is to provide an apparatus and a method for providing depth images in addition to RGB information of a human face to recognize facial expressions in video of different activities or expressions.

According to one aspect of the present invention, a human activity modeling method includes determining principal components of depth and/or binary shape images of human activities extracted from video clips. The method further includes determining Independent Component Analysis (ICA) representations based on the principal components. Features are determined through Linear Discriminant Analysis (LDA) based on the ICA representations. A codebook is determined using vector quantization. Observation symbol sequences in the video clips are determined. And human activities are learned using a Hidden Markov Model (HMM) based on a status transition and an observation matrix.

According to another aspect of the present invention, a human activity recognition method includes determining feature vectors of depth and/or binary shape images of human activities of a video clip. An observation symbol sequence is determined from the video clip. And a human activity model which maximizes a likelihood probability among activity models in a dictionary is determined.

According to yet another aspect of the present invention, a facial expression modeling method includes determining principal components of depth and/or RGB face images of facial expressions extracted from video clips. ICA representations are determined based on the principal components. Features are determined through LDA based on the ICA representations. A codebook is determined using vector quantization. Observation symbol sequences are determined in the video clips. And facial expressions are learned using an HMM based on a status transition and an observation matrix.

According to another aspect of the present invention, a facial expression recognition method includes determining feature vectors of depth and/or RGB face images of facial expressions of a video clip. An observation symbol sequence is determined from the video clip. And a facial expression model which maximizes a likelihood probability among facial expression models in a dictionary is determined.

According to another aspect of the present invention, a human activity modeling apparatus includes an input part for inputting video clips. A controller is configured to determine principal components of depth and/or binary shape images of human activities extracted from the video clips, determine ICA representations based on the principal components, determine features through LDA based on the ICA representations, determine a codebook using vector quantization, determine observation symbol sequences in the video clips, and learn human activities using HMM based on status transition and an observation matrix The apparatus further includes an output part for outputting a learning result.

According to another aspect of the present invention, a human activity recognition apparatus includes an input part for inputting a video clip. A controller is configured to determine feature vectors of depth and/or binary shape images of human activities of the video clip, determine an observation symbol sequence from the video clip, and determine a human activity model which maximizes a likelihood probability among activity models in a dictionary. An output part is configured to output a learning result.

According to another aspect of the present invention, a facial expression modeling apparatus includes an input part for inputting video clips. A controller is configured to determine principal components of depth and/or RGB face images of facial expressions extracted from the video clips, determine ICA representations based on the principal components, determine features through LDA based on the ICA representations, determine a codebook using vector quantization, determine observation symbol sequences in the video clips, and learn facial expressions using HMM based on status transition and an observation matrix. An output part is configured to output a learning result.

According to yet another aspect of the present invention, a facial expression recognition apparatus includes an input part for inputting a video clip. A controller is configured to determine feature vectors of depth and/or RGB face images of facial expressions of the video clip, determine an observation symbol sequence from the video clip, and determine a facial expression model which maximizes a likelihood probability among facial expression models in a dictionary. An output part is configured to output a determination.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 9A illustrates a human activity recognition result based on the depth and binary shape images according to an embodiment of the present invention; and FIG. 9B illustrates the facial expression recognition result based on the depth and RGB facial images using the present approach according to an embodiment of the present invention.

DETAILED DESCRIPTION OF THE INVENTION

FIGS. 1 through 9B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged communications system.

Embodiments of the present invention provide an apparatus and a method for video sensor-based human activity and facial expression modeling and recognition.

Herein, for feature extraction in independent component features of the human activity or the facial expression, Linear Discriminant Analysis (LDA) is adopted.

Human activity includes binary shape and/or depth images of the human body, and the facial expression includes depth images and/or RGB face images.

The modeling and the recognition of human activity or facial expression are carried out through vector quantization and Hidden Markov Model (HMM).

The HMM which is a probabilistic approach to the modeling and the recognition of the human activity and the facial expression, is used to encode time sequential information. To model and recognize human activities and facial expressions from the time sequential images, the HMM is a strong approach to apply.

For the efficient feature extraction, Independent Component Analysis (ICA) is suggested. Herein, independent component features are extracted using higher order statistics in the local state of the human body or the expression in the place of global such as Principal Component Analysis (PCA).

In addition, to generate a robust feature space, ICA representations of the image are classified by applying the LDA.

Figure 1:
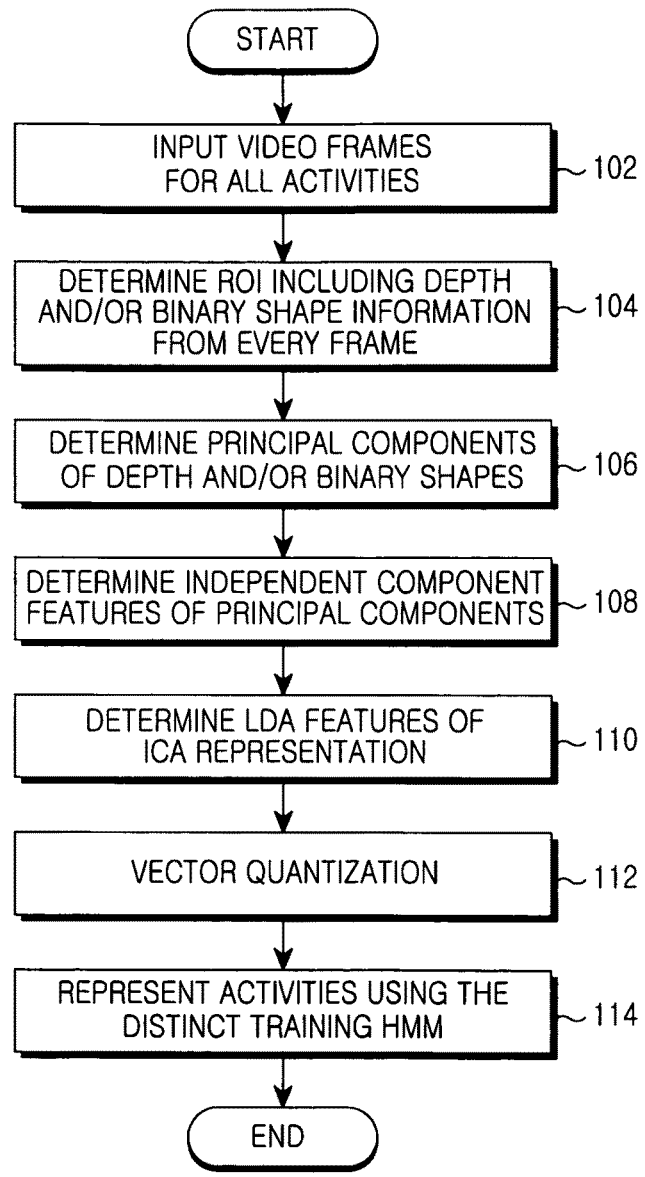
FIG. 1 illustrates a process of a human activity or facial expression modeling method according to an embodiment of the present invention.

FIG. 1 illustrates a process of the human activity or facial expression modeling method according to an embodiment of the present invention.

In FIG. 1, since 3D depth information is very useful to represent human activity in video relating to the different activities according to recent researches, the present invention conducts various feature extractions and analyses through the depth and/or binary shape images of the human body in the different activities.

In the human activity recognition, typically, the binary shape is widely used to represent the human shapes of the different human activities. However, this has some limitations in the human shape representation. That is, some human body components can remain hidden, and this shape misrepresentation can cause error in the recognition. Such a problem does not reveal in the depth information of the human body because the depth information represents the entire body well. Accordingly, embodiments of the present invention shall put the depth image of the human body of video frames before the binary shape information in the human activity modeling.

Referring now to FIG. 1, the human activity modeling method according to an embodiment of the present invention determines input video frames for all activities in block 102.

In block 104, the method determines Region of Interest (ROI) (e.g., depth and/or binary shape images of the human body) in each video frame. Collection of the depth and/or binary shape images is used to build a feature space for the modeling and the activity recognition.

In block 106, the method determines principal components using the PCA with the collection of the depth/and the binary shape images of the different activities. The PCA is the second order statistical approach for detecting the global features of the human body in the video frames. Before the PCA is applied, every depth and/or binary shape image vector is expressed in rows. Based on the following equation, the image vector is converted to a zero mean depth and/or binary shape image vector.

$$\tilde{X}_i = (X_i - \overline{X}) \quad \text{[Eqn. 1]}$$

$\overline{X}$ denotes a mean of the depth and/or binary shape image vectors. $X_i$ denotes the i-th depth and/or binary shape image vector. The PCA is used to approximate the original data with a lower-dimensional feature space.

A fundamental approach is to determine eigenvectors of a covariance data matrix Q, and then acquire an approximation using a linear combination of top eigenvectors.

The covariance matrix of the sample depth and/or binary shape image vector and the principal components of the covariance matrix are given by the following equations.

$$Q = \frac{1}{T} \sum_{i=1}^{T} \left( \tilde{X}_i \tilde{X}_i^T \right) \quad \text{[Eqn. 2]}$$

$$Q = E \Lambda E^T \quad \text{[Eqn. 3]}$$

T denotes the number of the depth and/or binary shape image vectors. Columns of E and diagonal values of $\Lambda$ indicate orthonormal eigenvectors and corresponding eigenvalues of the covariance matrix Q, respectively. The eigenvectors are the principal components representing the global features.

However, in pattern recognition, recent researches employ the ICA. The ICA is a higher order statistical approach superior to the PCA. The ICA algorithm finds statistically independent basis images. When S is a collection of basis images and X is a collection of input images, the relation between X and S is modeled based on the following equation.

$$Y = RX \quad \text{[Eqn. 4]}$$

R denotes an unknown linear mixing matrix of full rank. Sources are independent of each other, and the mixing matrix is invertible.

The ICA algorithm learns a weight matrix W, which is the inverse of the mixing matrix R, and is used to recover the set of the independent basis images S. The depth and/or binary shape images are represented as variables, and pixel values of the associated depth and/or binary shape images are observations of the variables.

Before the ICA is applied, the PCA is used to reduce the dimension of the total training image data. Unlike the PCA, the ICA basis images focus on the local feature information rather than global. The ICA algorithm is performed on the top m principal components $E_m^T$ in block 108. Hence, m independent basis images in the rows of S are given by the following equations.

$$S = W E_m^T \quad \text{[Eqn. 5]}$$

$$E_m^T = W^{-1} S \quad \text{[Eqn. 6]}$$

$$X_r = V W^{-1} S \quad \text{[Eqn. 7]}$$

$V = X E_m$ is a projection of the image X on $E_m$ and the reconstructed image $X_r$. Thus, the independent component representation $I_i$ of the i-th depth and/or binary shape image vector $\tilde{X}_i$ from the activity image sequence is given by the following equation.

$$I_i = \tilde{X}_i E_m W^{-1} \qquad \text{[Eqn. 8]}$$

$I_i$ includes coefficients for linearly combining the basis images constituting the i-th image vector.

Further, the ICA approach is extended by the Linear Discriminant Analysis (LDA) in block 110. The LDA is the second order statistical approach and the supervised classification. Using class specific information, the LDA maximizes the ratio inter- or intra-class scatter information. The LDA finds the vector in the underlying space for generating the best discrimination in the different classes, which is well known in the feature extraction and the dimension reduction. To acquire the maximum discrimination, data is projected into the lower-dimension space to maximize the ratio of the distance between the classes and the distance within the class.

Based on Equation 9 and Equation 10, the class scattering comparison is conducted on $S_W$ in the class and $S_B$ between the classes.

$$S_B = \sum_{i=1}^{c} J_i (\overline{m}_i - \overline{m})(\overline{m}_i - \overline{m})^T \qquad \text{[Eqn. 9]}$$

$$S_W = \sum_{i=1}^{c} \sum_{m_k \in C_i} (m_k - \overline{m}_i)(m_k - \overline{m}_i)^T \qquad \text{[Eqn. 10]}$$

$J_i$ denotes the number of the vectors in the i-th class $C_i$, c denotes the number of the classes, and T denotes the number of the activities. $\overline{m}$ denotes the mean of all of the vectors. $\overline{m}_i$ denotes the mean of the class $C_i$. $m_k$ denotes the vector of a specific class.

An optimum discrimination matrix $D_{opt}$ is selected by maximizing the ratio of the determinant within and between the class scatter matrices based on the following equation.

$$D_{opt} = \underset{D}{\operatorname{argmax}} \frac{|D^T S_B D|}{|D^T S_W D|} = [d_1, d_2, \ldots, d_t]^T \qquad \text{[Eqn. 11]}$$

$S_W$ and $S_B$ denote the inter-class scattering matrix and the intra-class scattering matrix. $D_{opt}$ is the set of the discriminant vectors of $S_W$ and $S_B$ corresponding to the (c-1) greatest generalized eigenvalues $\lambda$.

Thus, the extracted ICA representation of the depth and/or shape images of the extracted different activities can be extended by the LDA. The feature vectors using the LDA of the ICA can be represented based on the following equation.

$$F_i = I_i D_{opt}^T \qquad \text{[Eqn. 12]}$$

Next, a codebook is generated using the vector quantization algorithm in block 112. The codebook is useful to generate discrete symbols in the frames of the human activity video clip. In this regard, it is preferred to use Linde, Buzo, and Gray (LBG) clustering algorithm.

First, initialization is carried out by splitting a centroid of the entire dataset. Starting from one codebook, the centroid recursively is split into two codewords. After the splitting, the centroid is optimized to reduce distortion because this conforms to the splitting methods. The codebook size is a power of two.

Based on the training of the distinct HMM, each human activity is represented in block 114. It is preferred to use the HMM in the human activity modeling. The HMM can handle the sequential image data that includes the probabilistic learning capability for the recognition. The HMM is the stochastic process. The underlying stochastic process is not observable in general, but is observable using another set of stochastic processes which produce observation symbols. The HMM is frequently used to address problems in voice recognition or the handwriting recognition. The present invention adopts the HMM for the human activity.

The HMM is the collection of finite states connected by the transitions. Each state of the HMM can be explained using two types of probabilities. The two probabilities include the transition probability and the symbol observation probability. A generic HMM is given by the following equation.

$$H = \{\Xi, \pi, A, B\} \qquad \text{[Eqn. 13]}$$

$\Xi$ denotes possible states as $\Xi = (S_1, S_2, \ldots, S_q)$. q denotes the possible state, $\pi$ denotes the initial probability of the state, and A denotes the transition probability matrix between the hidden states. Herein, the transition probability $a_{i,j}$ denotes the probability of the state change from i to j.

B denotes the observation symbol probability from every state, and $B_j(O)$ denotes the probability of the observation symbol O from the state j. When the number of the activities is N, a dictionary $(H_1, H_2, \ldots, H_N)$ exists in the N trained models and A and B can be repeatedly trained by the Baum-Welch training estimation algorithm. The number of the states can be determined empirically. The increasing number of the states does not greatly affect the overall human activity recognition rate.

Figure 2:
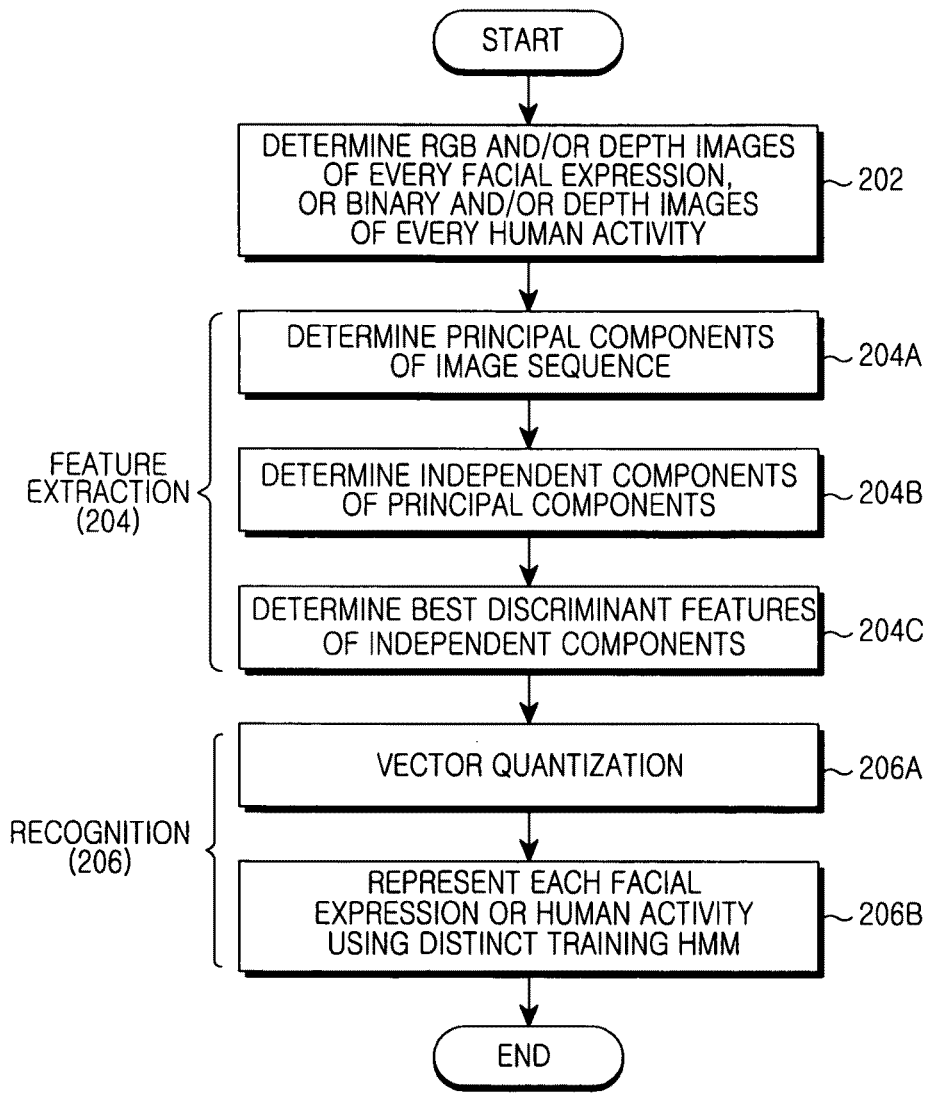
FIG. 2 illustrates a process of the human activity or facial expression modeling method according to an embodiment of the present invention.

FIG. 2 illustrates a process of the human activity or facial expression modeling method according to an embodiment of the present invention. FIG. 2 additionally considers the facial expression in FIG. 1.

Since recent researches prove that the depth information is useful in representing the human body or face in video for different activities, the present invention applies various feature extraction analyses through the depth and/or binary shape images of the human body in different activities or the depth and/or RGB face images in the video of different expressions.

In human activity recognition, typically, binary shape images are widely used for the human shape representation of different human activities, but have some limitations in the human shape representation. The limitation lies in that some body components can remain hidden and, thus, misrepresentation of the shape image can cause misrecognition.

Such problems are not visible in the depth information of the human body because the depth information represents the entire body well. In facial expression recognition, Facial Independent Component Analysis (FICA) offers an improved ability to extract better representation of the Red Green Blue (RGB) and depth features of the facial expressions. Thus, an embodiment of the present invention applies FICA over RGB and/or depth information based on the facial expression images.

Moreover, spatiotemporal variations of the face are assembled into a specific expression. Accordingly, the present invention utilizes sequential frames more than apex frames of each expression image.

Thus, in embodiments of the present invention, depth images of the human body or face in video frames are preferred in the human activity or facial expression modeling over the binary shape image of the human body and the RGB image of the facial expression information.

Referring to FIG. 2, the human activity or facial expression modeling method according to an embodiment of the present invention determines input video frames (the depth and/or binary shape images for the human activity, or the depth and/or RGB images for the facial expression) in block 202. The collection of all the images is used to build the feature space to model and recognize the activities or the expressions. First of all, the feature extraction is performed in block 204. Next, the recognition is performed in block 206.

The method determines principal components using the PCA over the collection of the images of different activities or expression in block 204A. The PCA is the second order statistical approach to find out the global features of the human body or face in the video frames.

Before the PCA is applied, all of the image vectors are expressed in rows and then converted to zero mean vectors based on Equation 1.

The PCA is used to approximate the original data with the lower-dimensional feature space.

The fundamental approach is to compute the eigenvectors of the covariance data matrix Q, and then acquire the approximation using the linear combination of the top eigenvectors.

The covariance matrix of the sample depth and/or binary shape image and the depth and/or RGB face image and the principal components of the covariance matrix are given by Equation 2 and Equation 3. Herein, the eigenvectors are the principal components indicating the global features.

Recent researches in the pattern recognition show the ICA. The ICA is a higher order statistical approach superior to the PCA.

When S is a collection of basis images and X is a collection of input images, the ICA algorithm finds the statistically independent basis images. Next, the relation between X and S is modeled by Equation 4.

The ICA algorithm learns the weight matrix W, which is the inverse of the mixing matrix R, and is used to recover the set of independent basis images S. The images are denoted as variables, and pixel values of the associated images are observations of the variable.

Before the ICA is applied, the PCA is used to reduce the dimension of the total training image data. Unlike the PCA, the ICA basis images focus on the local feature information than the global. The ICA algorithm is conducted on the top m principal components $E_m^T$ in block 204B. Thus, the m independent basis images in the rows of S are given by Equation 5, Equation 6, and Equation 7.

Further, the ICA approach is extended by the LDA in block 204C. The LDA, which is the second order statistical approach, is the supervised classification to maximize the ratio of inter- or intra-class scatter information using class specific information.

The LDA looks for the vectors in the underlying space to produce the best discrimination among difference classes. This is well known in the feature extraction and the dimension reduction.

To determine the maximum discrimination, the data is projected into the lower dimensional space so as to maximize the ratio of the inter-class distance and the intra-class distance. The class scattering comparison is conducted on the intra-class $S_W$ and the inter-class $S_B$ based on Equation 9 and Equation 10.

The optimal discrimination matrix $D_{opt}$ is selected from the maximization of the ratio of the determinant of the inter-class scatter matrix and intra-class scatter matrix based on Equation 11.

Thus, the extracted ICA representation of the depth and/or shape images of the different activities or the depth and/or RGB images of the different facial expressions can be extended by the LDA. The features vectors using the LDA of the ICA can be represented based on Equation 12.

A codebook is generated using the vector quantization algorithm in block 206A. The codebook is useful to generate the discrete symbols in the frames of the human activity or facial expression video clip.

In this regard, it is preferable to use the LBG clustering algorithm. First, the LBG algorithm performs the initialization by splitting the centroid of the entire dataset. Starting from one codebook, the centroid is recursively split into two codewords.

After the splitting, the centroid is optimized to reduce the distortion because this conforms to the splitting methods. The codebook size is power of two.

Based on the training of the distinct HMM, each human activity or facial expression is represented in block 206B. In some embodiments, the use of the HMM is preferred in human activity or facial expression modeling. The HMM can handle the sequential image data that includes the probabilistic learning capability for the recognition.

The HMM is the stochastic process. The underlying stochastic process is usually not observable, but can be observable using another set of stochastic processes which produce observation symbols. The present invention employs the HMM for the human activity and facial expression recognition.

The HMM is the collection of the finite states connected by the transitions. Every state of the HMM can be described with two types of probabilities; that is, the transition probability and the symbol observation probability. The generic HMM is given by Equation 13.

When the number of the activities or the facial expression is N, there exists the dictionary $(H_1, H_2, \ldots, H_N)$ in the N trained model and A and B can be repeatedly trained by the Baum-Welch training estimation algorithm.

The number of the states can be determined empirically, and the increasing number of the states does not greatly affect the overall human activity or facial expression recognition rate.

In an embodiment of the present invention, an example of the HMM with four states selected to model the activity or the facial expression will be described. An identical value to the transition probability from each state of the HMM will be explained.

Figure 3A:
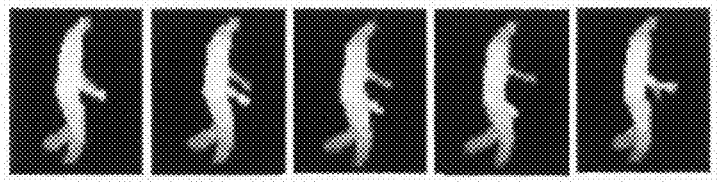
FIG. 3A illustrates a depth image sequence of walking activity according to an embodiment of the present invention.
Figure 3B:
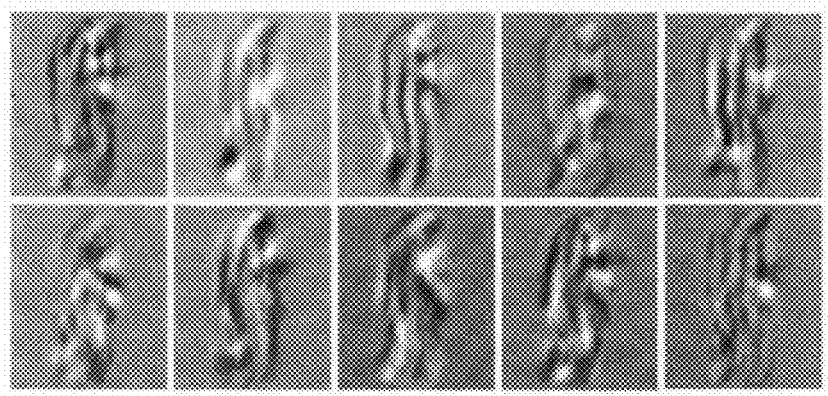
FIG. 3B illustrates principal component features for the depth images of five activity classes such as walking, running, skipping, boxing, and sitting/standing according to an embodiment of the present invention.
Figure 3C:
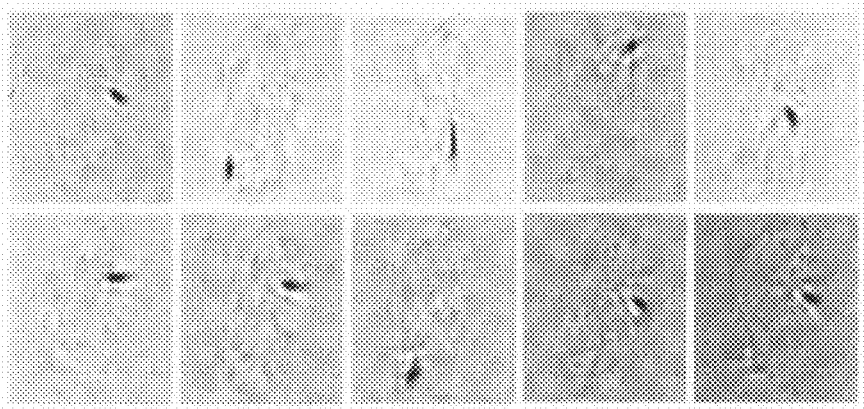
FIG. 3C illustrates independent component features for the depth images of the five activity classes such as walking, running, skipping, boxing, and sitting/standing according to an embodiment of the present invention.

FIGS. 3A, 3B, and 3C show the sample feature extraction outputs for five classes of different depth images, including walking, running, skipping, boxing, and sitting/standing according to an embodiment of the present invention.

FIG. 3A illustrates a depth image sequence of the walking activity, and FIG. 3B illustrates principal components and global features of the different activities including walking, running, skipping, boxing, and sitting/standing.

FIG. 3C illustrates independent components of the different activities including walking, running, skipping, boxing, and sitting/standing with respect to the depth image, and represents the local parts of the human body such as arms and legs. FIG. 3C shows an example of the depth images.

Figure 4A:
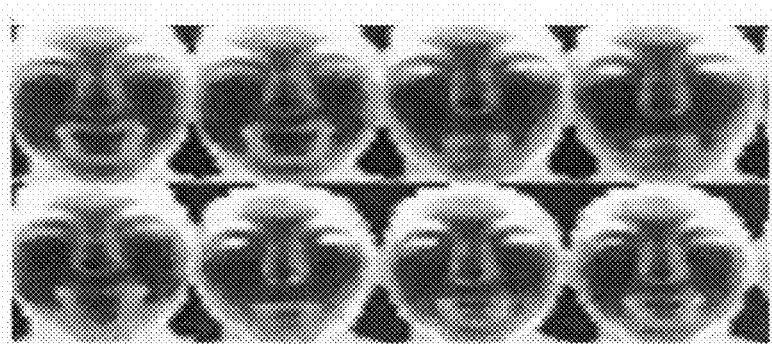
FIG. 4A illustrates different facial expression depth image sequence such as anger, joy, sadness, and surprise according to an embodiment of the present invention.
Figure 4B:
FIG. 4B illustrates principal component features of the different facial expression depth image sequence such as anger, joy, sadness, and surprise according to an embodiment of the present invention.
Figure 4C:
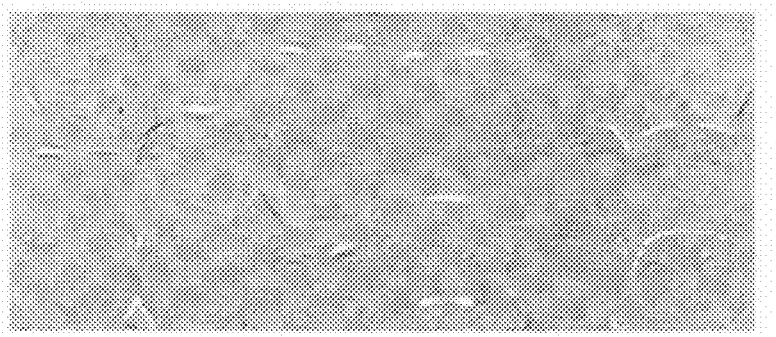
FIG. 4C is a diagram of independent components of the different facial expression depth image sequence such as anger, joy, sadness, and surprise according to an exemplary embodiment of the present invention.

FIGS. 4A, 4B, and 4C show the sample feature extraction outputs for four classes of different facial expression depth images including anger, joy, sadness, and surprise according to an embodiment of the present invention.

FIG. 4A illustrates a depth image sequence of the facial expression. FIG. 4B illustrates principal component features (global features) of the depth face image, and FIG. 4C illustrates independent component features of the depth face image and represents the local parts of the human body such as lips and eyebrows.

Figure 5A:
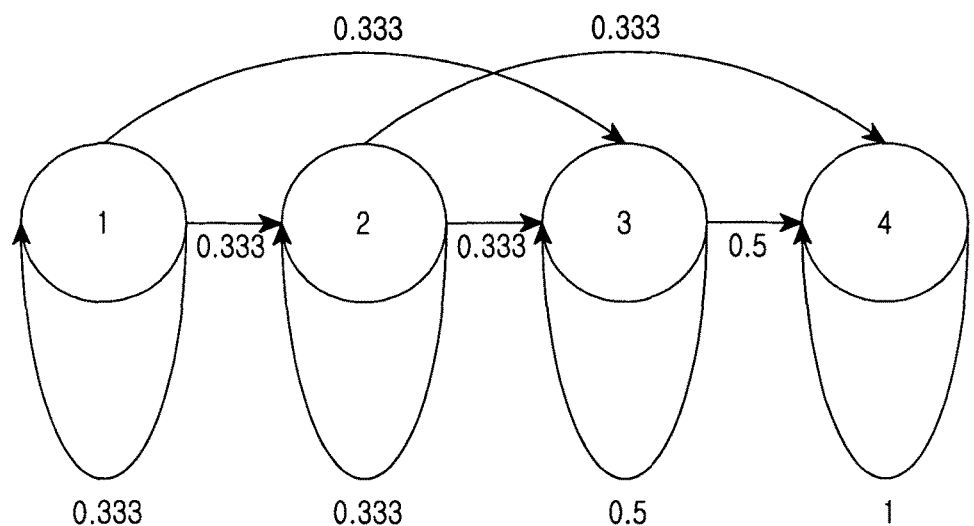
FIG. 5A illustrates a basic structure and transition probabilities between states before the HMM training for the walking activity according to an embodiment of the present invention.
Figure 5B:
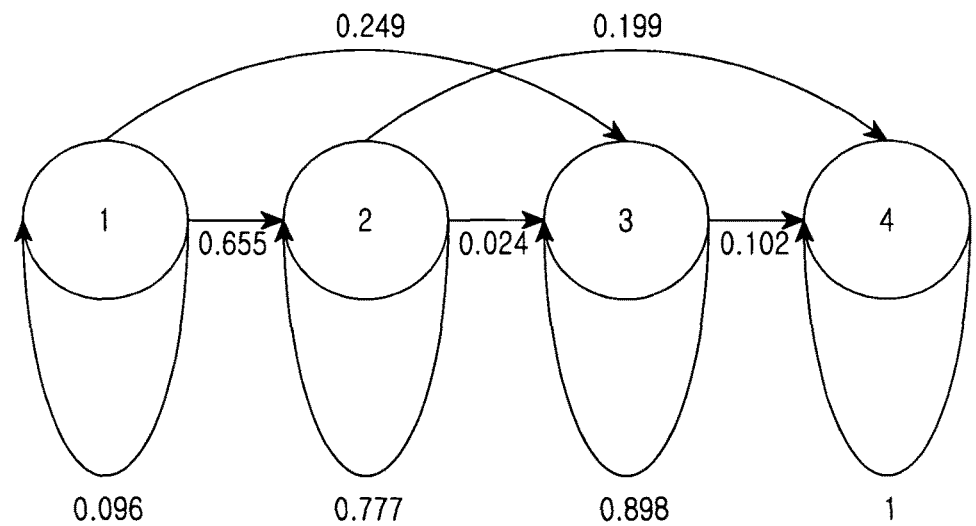
FIG. 5B illustrates a basic structure and transition probabilities between states after the HMM training for the walking activity according to an embodiment of the present invention.

FIG. 5A illustrates a basic structure and the transition probabilities between the states before the HMM training for the walking activity according to an embodiment of the present invention, and FIG. 5B illustrates a basic structure and the transition probabilities between the states after the HMM training for the walking activity according to an embodiment of the present invention. FIGS. 5A and 5B show the left-to-right four state walking HMM structure and the transition probabilities between the states as an instance.

In FIG. 5A, the example of the HMM for the walking activity before the training is illustrated. Herein, the total transition probability from any state is one ('1'). The probabilities are uniformly distributed before the training.

The transition probability from the state '1' to itself and the transition probabilities to the state '2' and to the state '3' are uniformly set to 0.3333. The probability from the state '2' to the state '3' and the probability from the state '2' to the state '4' are set to 0.333 as well. Since there are only two transitions from the state '3', each probability is 0.5. The transition probability from the state '4' to itself is one ('1').

Thus, the transition probabilities of the HMM of the different activities are initialized in the same manner. Moreover, it is noted that the observation symbols are uniformly distributed before the training.

Referring to FIG. 5B, the walking models after the training are illustrated. The transition probabilities between the states depend on the training based on the discrete observation symbol sequences determined after the vector quantization of the LDA of the ICA features of the image vectors.

As the final state, for example, the state '4' has only one transition to itself in any situation. Accordingly, the transition probability from the final state is always '1' after the training. The above explanations are also applicable to the facial expression HMM.

The probabilities of the observation symbols from the states are determined after the parameter estimation based on the training symbol sequences under the training process of the activity or expression HMM. According to the aforementioned recognition method, complex human activities or expression are efficiently modeled for the recognition.

Now, the human activity or facial expression recognition method is illustrated.

Figure 6:
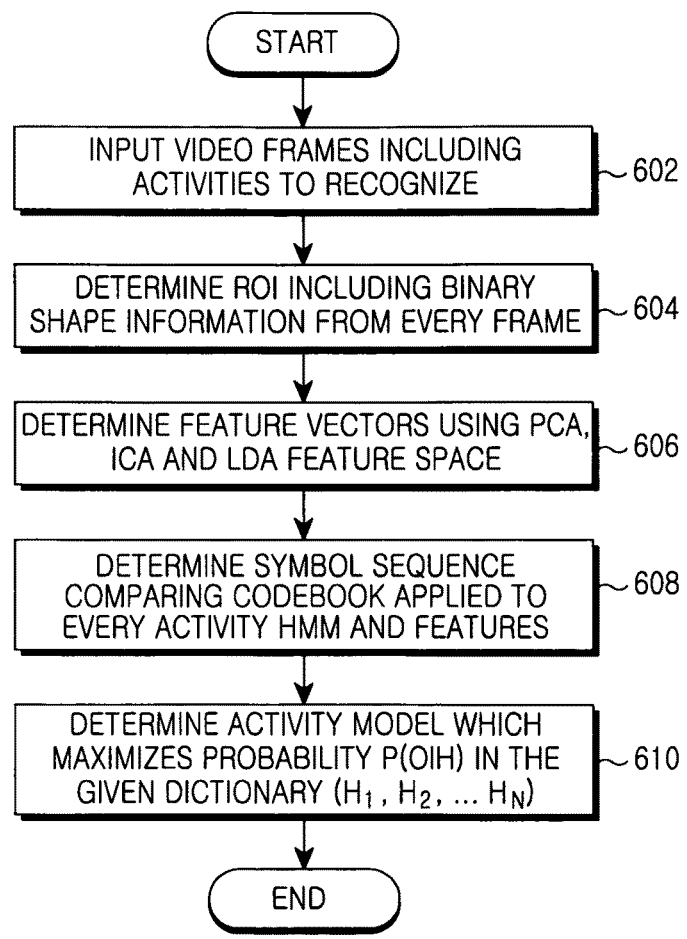
FIG. 6 illustrates a process for recognizing the human activity according to an embodiment of the present invention.

FIG. 6 illustrates a process for recognizing the human activity according to an embodiment of the present invention.

In FIG. 6, video frames including the activity to recognize are input in block 602. The method acquires the depth and/or binary shape information ROI in the video frames including the activity in block 604.

When a testing sequence of the depth and/or binary shape image is available, the testing sequence is converted to row vectors for subsequent processes. Next, the feature vectors are determined using the LDA, the ICA, and the PCA feature space in block 606.

In block 608, the symbol sequence is acquired from the features of the depth and/or shape images to recognize the activities respectively. Herein, once the feature vectors are determined, they are quantized by means of distance measurement between each feature vector and the codebook vectors. The codebook can be designed using the vector quantization algorithm on the image vectors of all the activities or expressions.

For the feature vector, an index number of the codeword vector from the codebook is selected as a symbol which has the minimum distance from the corresponding feature vector. After the symbol sequence is determined, the activity in the video clip is carried out in block 610. That is, an adequate model is selected.

When T number of frames exists in the clip, there will be T number of the depth and/or shape images together with T number of the features $(F_1, F_2 \ldots, F_T)$.

After the vector quantization, T discrete symbols (one symbol per frame) are acquired as $O=\{o_1, o_2, \ldots, o_T\}$. The symbol sequence O is applied on every HMM according to P(O|H) in the dictionary $(H_1, H_2, \ldots, H_N)$ of N trained symbols of N activities to determine likelihood probabilities of the models. The model producing the maximum likelihood is the representative one for testing the activity video clip. Based on this, the activity in the testing video clip can be recognized.

The likelihood of the symbol sequence where the HMM is given is determined using a forward algorithm. Hence, the likelihood of the observation sequence O at time t is determined using a forward variable α. A model H is given by Equation 14.

$$P(O \mid H) = \sum_{i=1}^{q} \alpha_i(i) \quad \text{[Eqn. 14]}$$

As such, it is possible to recognize the complex human activity in the video clip.

Figure 7:
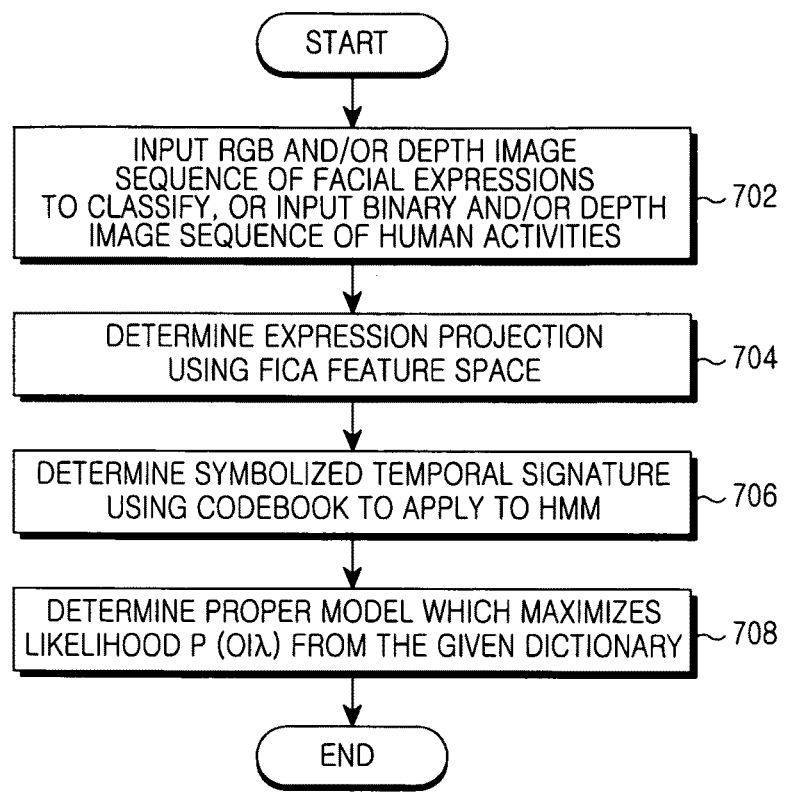
FIG. 7 illustrates a process for recognizing the human activity or the facial expression according to an embodiment of the present invention.

FIG. 7 illustrates a process for recognizing the human activity or the facial expression according to an embodiment of the present invention, where the facial expression is additionally considered in FIG. 6.

In FIG. 7, from each frame of the testing video clip, an image including the depth and/or binary shape information of the human body or the depth and/or RGB image of the face is determined in block 702. The image sequence indicates sequential images.

When the testing image sequence is available, the testing sequence is converted to row vectors for subsequent processes. Next, features vectors are determined using the LDA, the ICA, and the PCA feature space in block 704. That is, the representation (or the expression) projection is determined.

Next, a symbol sequence (or symbolized temporal signature) is acquired from the feature of the depth and/or shape image in the video clip to recognize each activity in block 706.

Herein, once the feature vectors are determined, they are quantized by means of the distance measurement between each feature vector and the codebook vectors. The codebook can be designed using the vector quantization algorithm on the image vectors of all the activities. For the feature vector, the index number of the codeword vector from the codebook is selected as a symbol which has the minimum distance from the corresponding feature vector.

After the symbol sequence is determined, the activity in the video clip is carried out in block 708. That is, an adequate model is selected.

When T number of frames exist in the clip, there will be T number of the images together with T number of the features $(F_1, F_2 \ldots, F_T)$.

After the vector quantization, T discrete symbols (one symbol per frame) are acquired as $O=\{o_1, o_2, \ldots, o_T\}$. The symbol sequence O is applied on every HMM according to P(O|λ) in the dictionary of N trained symbols of N activities to determine likelihood probabilities of the models.

The model producing the maximum likelihood is the representative one for testing the activity video clip. Based on this, the activity or the facial expression in the testing video clip can be recognized.

The likelihood of the symbol sequence where the HMM is given is determined using the forward algorithm. Hence, the likelihood of the observation sequence O at time t is determined using the forward variable α. The model H is given by Equation 14.

As such, it is possible to recognize the complex human activity or facial expression in the video clip. Especially, the human activity or facial expression can be recognized without segmenting the human body or face.

In summary, the human activity or facial expression modeling method is constituted as below.

The method includes determining the principal components of the depth and/or binary shape images or the RGB face images of the human activities or the facial expression extracted from the video clips, determining the ICA representations based on the principal components, determining the features through the LDA base on the ICA representations, determining the codebook using the vector quantization, determining the observation symbol sequence in the video clips, and learning the human activities or the facial expressions using the HMM based on the status transition and the observation matrix.

Herein, the determining of the principal components of the depth and/or binary shape images or the RGB face images of the human activities or the facial expression extracted from the video clips determines at least one principal component representing the entire image based on the human body representation or the facial expression representation of the depth and/or binary shape images of the human activities or the facial expressions or the RGB face images.

Herein, the determining of the ICA representations based on the principal components determines the independent ICA representations from the principal components. The ICA representation focuses on the arms, legs, nose, and eyes.

The determining of the features through the LDA based on the ICA representation emphasizes the features of the ICA representation to distinguish the ICA representations in the depth and/or binary shape images of the human activity or the RGB face images. The LDA scheme is also called a fisherface method.

The determining of the codebook using the vector quantization includes classifying the features determined through the LDA into at least one group using the vector quantization, and assigning a code to the classified group.

The determining of the observation symbol sequence in the video clips determines codes of the video clips using the codes in the codebook, and the code order. For example, the walking activity indicates in which group and in which observation symbol sequence the features are processed. That is, video information of the walking activity includes '1', '6', '10', and '25' feature groups and these groups are represented in the temporal order of '6'→'10'→'1'→'25'.

The learning of the human activities or the facial expressions using the HMM based on the status transition and the observation matrix includes generating of the HMM per human activity or facial expression, and learning each HMM using the observation symbol sequence.

The human activity or facial expression recognition method of the present invention is carried out as below.

The method includes determining the feature vectors from the depth and/or binary shape images or RGB face images of the human activities or the facial expressions of the video clip, determining the observation symbol sequence from the video clip, and determining the human activity or facial expression model which maximizes the likelihood probability among the activity or facial expression models in the dictionary.

The determining of the human activity or facial expression model which maximizes the likelihood probability among the activity or facial expression models in the dictionary determines the human activity or facial expression model which maximizes the likelihood probability from the human activity or facial expression HMM dictionary.

Additionally, the human activity or facial expression modeling and recognition methods can be coded and executed with the help of programming language on a computer. A program can be saved in a computer-readable storage medium.

Figure 8:
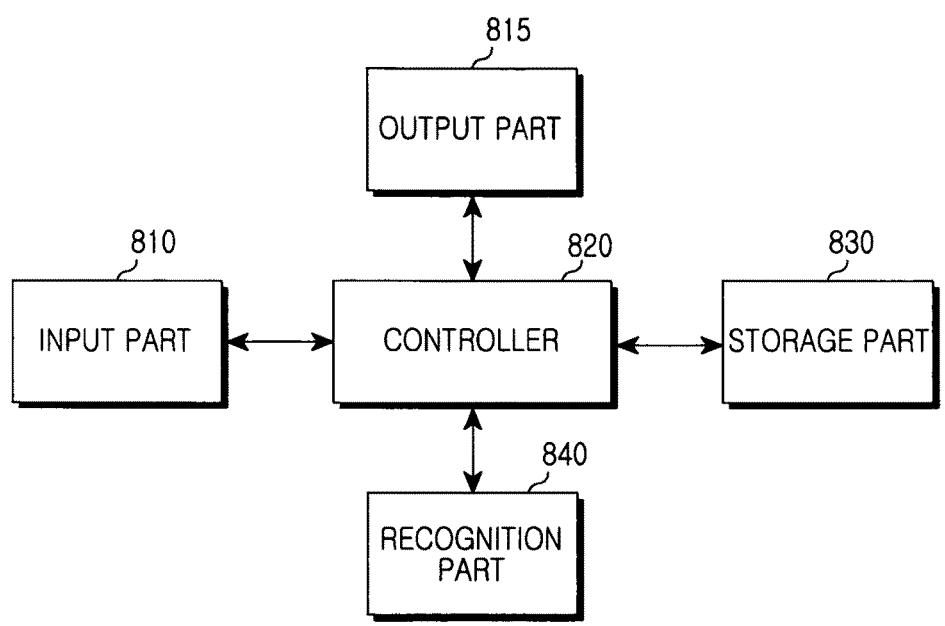
FIG. 8 illustrates an apparatus for recognizing the human activity or the facial expression according to an embodiment of the present invention.

FIG. 8 illustrates an apparatus for recognizing the human activity or the facial expression according to an embodiment of the present invention.

The apparatus of FIG. 8 includes an input part 810, an output part 815, a controller 820, a storage part 830, and a recognition part 840.

The input part 810 is an input port for receiving data. The input data can be video data.

The output part 815 can output the activity or facial expression determined by the apparatus. The output part 815 can output data as a document or onto a screen.

The controller 820 controls the apparatus. In particular, the controller 820 controls the recognition part 840.

The storage part 830 stores a program for controlling the apparatus and temporary data generating in the program execution. The storage part 830 can store the video clip or the output data.

The recognition part 840 carries out the human activity or facial expression recognition as stated above. In detail, the recognition part 840 performs the features extraction and the recognition from the input RGB image, the depth image, or the binary shape image.

In the feature extraction, the recognition part 840 acquires the principal components from the corresponding image sequence, the independent components, and the best discriminant feature of the independent component.

In the recognition process, the recognition part 840 recognizes the human activity or the facial expression using the vector quantization and the training HMM.

As constructed above, the controller 820 can function as the recognition part 840. Herein, the controller 820 and the recognition part 840 are separately provided to distinguish their functions.

In the actual product, the controller 820 can process all or part of the functions of the recognition part 840.

FIG. 9A shows the human activity recognition result based on the depth and binary shape images according to an embodiment of the present invention, and FIG. 9B shows the facial expression recognition result based on the depth and RGB facial images using the present approach according to an embodiment of the present invention.

Referring to FIGS. 9A and 9B, when the depth images are used, the recognition rate is higher.

The depth and/or binary shape information-based human body representation or the depth and/or RGB information-based human face representation and feature extraction in combination with the vector quantization and the time sequential information-based on recognition engine such as HMM, can build an efficient human activity or facial expression modeling and recognition system.

As set forth above, the different human activities or expressions be easily modeled and recognized without segmenting the human body or face.

The present invention can recognize the human activity or expression without segmenting the human body or face.

Further, the higher recognition rate can be achieved by using the depth images, in comparison to not using the depth images.

Although the present disclosure has been described with various embodiments, various changes and modifications may be suggested to one skilled in the art. It is intended that the present disclosure encompass such changes and modifications as fall within the scope of the appended claims.

What is claimed is:

1. A human activity modeling method comprising:
determining, by a controller, principal components of depth images and binary shape images of human activities extracted from video clips, wherein the depth images of the human activities are different images than the binary shape images of the human activities;
determining, by the controller, Independent Component Analysis (ICA) representations based on the principal components;
determining, by the controller, features through Linear Discriminant Analysis (LDA) based on the ICA representations;
determining, by the controller, a codebook using vector quantization;
determining, by the controller, observation symbol sequences in the video clips; and
identifying, by the controller, human activities using a Hidden Markov Model (HMM) based on a status transition and an observation matrix.

2. The human activity modeling method of claim 1, wherein determining the principal components of the depth images and binary shape images of the human activities extracted from the video clips comprises:
determining at least one principal component representing an entire image based on a human body representation of the depth images and binary shape images.

3. The human activity modeling method of claim 1, wherein determining the ICA representations based on the principal components comprises:
determining independent ICA representations in the principal components.

4. The human activity modeling method of claim 1, wherein determining the features through the LDA based on the ICA representations comprises:
emphasizing features of the ICA representations to distinguish the ICA representations in the depth images and binary shape images.

5. The human activity modeling method of claim 1, wherein determining the codebook using the vector quantization comprises:
classifying the features determined through the LDA into at least one group using the vector quantization; and
assigning a code to the at least one classified group.

6. The human activity modeling method of claim 1, wherein determining the observation symbol sequences in the video clips comprises:
determining codes of the video clip and a code arrangement order using codes of the codebook.

7. The human activity modeling method of claim 1, wherein identifying the human activities using the HMM based on the status transition and the observation matrix comprises:
generating the HMM for each human activity; and
identifying each generated HMM using the observation symbol sequences.

8. The human activity modeling method of claim 1, wherein the video clip is represented using the HMM based on the status transition and a symbol observation matrix.

9. A human activity modeling apparatus comprising:
an input interface configured to receive video clips;
a controller configured to:
determine principal components of depth images and binary shape images of human activities extracted from the video clips, wherein the depth images of the human activities are different images than the binary shape images of the human activities,
determine Independent Component Analysis (ICA) representations based on the principal components,
determine features through Linear Discriminant Analysis (LDA) based on the ICA representations,
determine a codebook using vector quantization,
determine observation symbol sequences in the video clips, and
identify human activities using a Hidden Markov Model (HMM) based on a status transition and an observation matrix; and
an output interface configured to send an identified result.

10. The human activity modeling apparatus of claim 9, wherein the controller is further configured to determine the principal components of the depth images and binary shape images of the human activities extracted from the video clips by determining at least one principal component representing an entire image based on a human body representation of the depth images and binary shape images.

11. The human activity modeling apparatus of claim 9, wherein the controller is further configured to determine the ICA representations based on the principal components by determining independent ICA representations in the principal components.

12. The human activity modeling apparatus of claim 9, wherein the controller is further configured to determine the features through the LDA based on the ICA representations by emphasizing features of the ICA representations to distinguish the ICA representations in depth images and binary shape images.

13. The human activity modeling apparatus of claim 9, wherein the controller is further configured to determine the codebook using the vector quantization by classifying the features determined through the LDA into at least one group using the vector quantization and assigning a code to the at least one classified group.

14. The human activity modeling apparatus of claim 9, wherein the controller is further configured to determine the observation symbol sequences in the video clips by determining codes of the video clip and a code arrangement order using codes of the codebook.

15. The human activity modeling apparatus of claim 9, wherein the controller is further configured to identify the human activities using the HMM based on the status transition and the observation matrix by generating the HMM for each human activity and identifying each HMM using the observation symbol sequences.

16. The human activity modeling apparatus of claim 9, wherein the video clip is represented using the HMM based on the status transition and a symbol observation matrix.

* * * * *